United States Patent
Zucker et al.

(10) Patent No.: US 9,666,979 B1
(45) Date of Patent: May 30, 2017

(54) AUDIO HEADSET ELECTRICAL CABLE TERMINATION

(71) Applicant: Bose Corporation, Framingham, MA (US)

(72) Inventors: Natalie Zucker, Boston, MA (US); Jian Wu Zhou, Shenzhen (CN)

(73) Assignee: Bose Corporation, Framingham, MA (US)

( * ) Notice: Subject to any disclaimer, the term of this patent is extended or adjusted under 35 U.S.C. 154(b) by 0 days.

(21) Appl. No.: 15/159,280

(22) Filed: May 19, 2016

(51) Int. Cl.
*H01R 13/58* (2006.01)

(52) U.S. Cl.
CPC ..... *H01R 13/5833* (2013.01); *H01R 13/5845* (2013.01)

(58) Field of Classification Search
CPC .. H01R 13/5808; H01R 13/58; H01R 13/562; H01R 13/5845; H01R 13/5816; H01R 13/516; H01R 13/5825
USPC ................................................. 439/455, 464
See application file for complete search history.

(56) References Cited

U.S. PATENT DOCUMENTS

| | | | | |
|---|---|---|---|---|
| 4,564,255 A | * | 1/1986 | Kirma | H01R 13/5804 439/471 |
| 4,874,908 A | * | 10/1989 | Johansson | H01B 7/0045 174/112 |
| 7,956,290 B2 | * | 6/2011 | Wang | H01B 11/00 174/117 F |
| 9,048,651 B2 | | 6/2015 | Turner | |

* cited by examiner

*Primary Examiner* — Xuong Chung Trans
(74) *Attorney, Agent, or Firm* — Brian M. Dingman; Dingman IP Law, PC

(57) ABSTRACT

An assembly, and methods of fabricating the assembly. The assembly has an electrical cable that has a number of separate conductors, a bundle of cable reinforcing strands, and an outer jacket surrounding all of the conductors and the bundle. The conductors and the bundle protrude from an end of the outer jacket. A stopper element surrounds the end of the outer jacket and the portions of the conductors and bundle where they protrude from the outer jacket. Distal ends of the conductors and the bundle protrude from the stopper element. The distal end of the bundle that protrudes from the stopper element is divided into multiple protruding bundle portions, and a first protruding bundle portion is wrapped at least partly around the stopper element in one direction and a second protruding bundle portion is wrapped at least partly around the stopper element in another direction.

20 Claims, 2 Drawing Sheets

AUDIO HEADSET ELECTRICAL CABLE TERMINATION

BACKGROUND

This disclosure relates to the termination of an electrical cable.

Electrical cables for consumer electronics such as headsets and the like typically carry a number of conductors that are physically and electrically terminated in a housing. The termination arrangement needs to be such as to prevent tugs on the cable from having an effect on the electrical terminations, which are typically solder joints. Since solder joints have little tensile strength, the cable needs to be terminated such that the force is carried by parts of the cable other than the ends of the conductors.

SUMMARY

All examples and features mentioned below can be combined in any technically possible way.

In one aspect, an assembly for providing stress relief for electrical terminations of an audio headset cable, where the electrical cable has a number of separate conductors, a bundle of cable reinforcing strands, and an outer jacket surrounding all of the conductors and the bundle, wherein the conductors and the bundle protrude from an end of the outer jacket, includes a stopper element that surrounds the end of the outer jacket and the portions of the conductors and bundle where they protrude from the outer jacket. Distal ends of the conductors and the bundle protrude from the stopper element. The distal end of the bundle that protrudes from the stopper element is divided into multiple protruding bundle portions, and a first protruding bundle portion is wrapped at least partly around the stopper element in one direction and a second protruding bundle portion is wrapped at least partly around the stopper element in another direction.

Embodiments may include one of the following features, or any combination thereof. The conductors may be jacketed. The stopper element may be unitary. The stopper element may be overmolded onto the end of the outer jacket and the portions of the conductors and bundle where they protrude from the outer jacket. The wrapped protruding bundle portions may be coupled to the stopper element, for example using an adhesive.

Embodiments may include one of the following features, or any combination thereof. The first protruding bundle portion may be wrapped fully around the stopper element in one direction and the second protruding bundle portion may be wrapped fully around the stopper element in another direction. The outer jacket of the electrical cable may have a top side and an opposing bottom side, and the first protruding bundle portion may be wrapped around the stopper element proximate the top side of the outer jacket and the second protruding bundle portion may be wrapped around the stopper element proximate the bottom side of the outer jacket. The first and second protruding bundle portions may be wrapped around the stopper element above the distal ends of the conductors that protrude from the stopper element. The stopper element may have a generally planar front face from which the distal ends of the conductors and bundle protrude, and the first protruding bundle portion may be wrapped around the stopper element generally in a first plane that is generally perpendicular to the front face of the stopper element, and the second protruding bundle portion may be wrapped around the stopper element generally in a second plane that is spaced from the first plane and generally perpendicular to the front face of the stopper element.

In another aspect, an assembly for providing stress relief for electrical terminations of an audio headset cable, where the electrical cable comprises a plurality of separate conductors, a bundle of cable reinforcing strands, and an outer jacket at least partially surrounding the conductors and the bundle, and wherein the conductors and the bundle protrude from an end of the outer jacket, includes a unitary stopper element overmolded onto and surrounding the end of the outer jacket and the portions of the conductors and bundle where they protrude from the outer jacket, where distal ends of the conductors and the bundle protrude from the stopper element. The distal end of the bundle that protrudes from the stopper element is divided into multiple protruding bundle portions, wherein a first protruding bundle portion is wrapped fully around the stopper element in one direction and fixed to the stopper element, and wherein a second protruding bundle portion is wrapped fully around the stopper element in another direction and fixed to the stopper element.

Embodiments may include one of the following features, or any combination thereof. The outer jacket of the electrical cable may have a top side and an opposing bottom side, and the first protruding bundle portion may be wrapped around the stopper element proximate the top side of the outer jacket, and the second protruding bundle portion may be wrapped around the stopper element proximate the bottom side of the outer jacket. The first and second protruding bundle portions may both be wrapped around the stopper element above the distal ends of the conductors that protrude from the stopper element. The stopper element may have a generally planar front face from which the distal ends of the conductors and bundle protrude, and wherein the first protruding bundle portion is wrapped around the stopper element generally in a first plane that is generally perpendicular to the front face of the stopper element, and wherein the second protruding bundle portion is wrapped around the stopper element generally in a second plane that is spaced from the first plane and generally perpendicular to the front face of the stopper element.

In another aspect, a method for terminating an electrical cable of an audio headset comprising a plurality of separate conductors, a bundle of cable reinforcing strands, and an outer jacket surrounding all of the conductors and the bundle, wherein the conductors and the bundle protrude from an end of the outer jacket, includes surrounding the end of the outer jacket and the portions of the conductors and bundle where they protrude from the outer jacket with a stopper element, wherein distal ends of the conductors and the bundle protrude from the stopper element, dividing the distal end of the bundle that protrudes from the stopper element into multiple protruding bundle portions, wrapping one protruding bundle portion at least partly around the stopper element in one direction, wrapping another protruding bundle portion at least partly around the stopper element in another direction, and coupling the wrapped bundles to the stopper element.

Embodiments may include one of the above and/or below features, or any combination thereof. The conductors may be jacketed. The stopper element may be unitary. The surrounding step may comprise overmolding the stopper element onto the end of the outer jacket and the portions of the conductors and bundle where they protrude from the outer jacket. The coupling step may comprise fixing the wrapped protruding bundle portions to the stopper element with an adhesive.

Embodiments may include one of the above and/or below features, or any combination thereof. The first and second protruding bundle portions may both be wrapped fully around the stopper element. The outer jacket of the electrical cable may have a top side and an opposing bottom side, and the first protruding bundle portion may be wrapped around the stopper element proximate the top side of the outer jacket and the second protruding bundle portion may be wrapped around the stopper element proximate the bottom side of the outer jacket. The first and second protruding bundle portions may be wrapped around the stopper element above the distal ends of the conductors that protrude from the stopper element. The stopper element may have a generally planar front face from which the distal ends of the conductors and bundle protrude, and the first protruding bundle portion may be wrapped around the stopper element generally in a first plane that is generally perpendicular to the front face of the stopper element, and the second protruding bundle portion may be wrapped around the stopper element generally in a second plane that is spaced from the first plane and generally perpendicular to the front face of the stopper element.

DETAILED DESCRIPTION

The subject assembly can be used to terminate a cable that carries a number of separate conductors, and has a bundle of reinforcing strands. A stopper element can be overmolded on the end of the cable and part of the protruding conductors and reinforcing bundle. The reinforcing bundle is then split and wrapped around the stopper element. The stopper element is fitted in the housing such that the stopper element cannot be easily pulled from the housing.

Figure 1A:
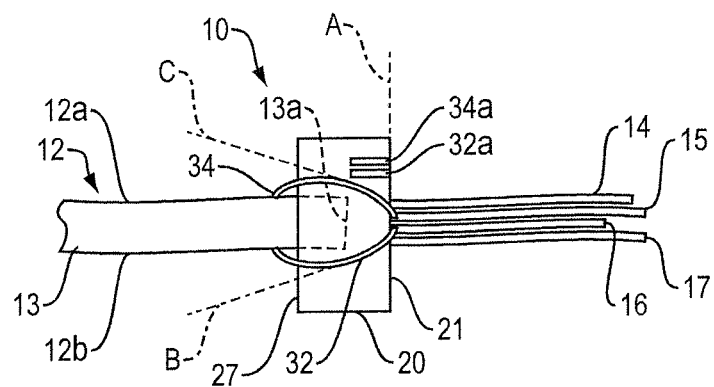
FIG. 1A is a partial, schematic side-view of an assembly according to this disclosure.
Figure 1B:
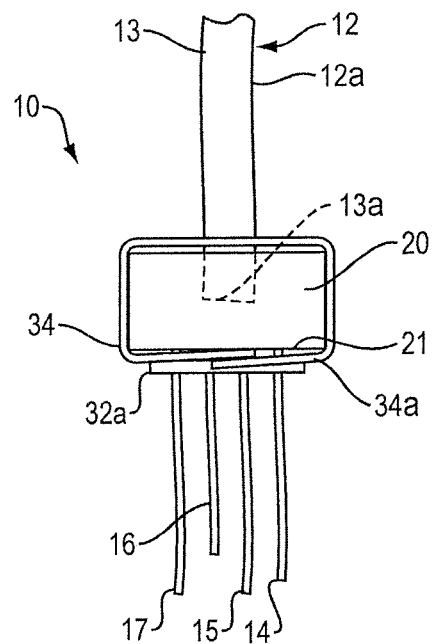
FIG. 1B is a partial, schematic top view of the assembly of FIG. 1A.

An exemplary assembly 10 is schematically depicted in FIGS. 1A and 1B. Assembly 10 includes jacketed electrical cable 12. Cable 12 includes a number of separate jacketed conductors; in this non-limiting example conductors 14-17 are shown, but the cable could have as few as two or as many as twelve or more separate conductors, depending on the application. Also, the conductors do not need to be jacketed. Cable 12 also includes a bundle 30 of flexible cable reinforcing strands. In one non-limiting example bundle 30 comprises a number of strands of Kevlar. Bundle 30 can have a different configuration and can include or be made from other reinforcing material such as an aramid or other flexible but strong fibers. Reinforcing bundle 30 is present in order to increase the cable's tensile strength. Cable 12 may include one or more such reinforcing bundles. Outer jacket 13 (when present) surrounds all of the conductors 14-17 and the reinforcing bundle 30. Conductors 14-17 and bundle 30 protrude from an end 13a of outer jacket 13 prior to being assembled as described herein.

Figure 2:
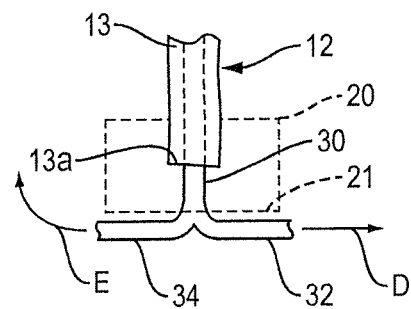
FIG. 2 is a partial, schematic top view of the assembly of FIGS. 1A and 1B, illustrating part of the wrapping process.
Figure 3:
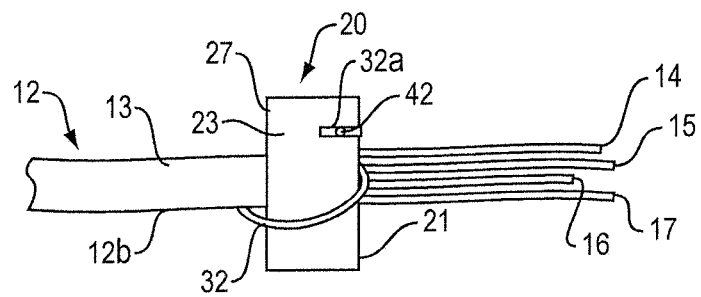
FIG. 3 is a partial, schematic side view of the assembly of FIGS. 1A and 1B, illustrating one wrapped reinforcing bundle portion.

A stopper element 20 surrounds end 13a of outer jacket 13, and also surrounds the portions of conductors 14-17 and bundle 30 where they protrude from the end 13a of outer jacket 13. Stopper element 20 has a perimeter, partially defined by front face 21, rear side 27 and side 23 (FIG. 3). Stopper element 20 can take any desired shape; the generally cubical shape shown in the drawings is but one of myriad possible shapes. In one non-limiting example the shape is selected in part based on it fitting snugly into a receiving cavity of a housing, as is described in more detail below. The distal ends of conductors 14-17 and bundle 30 protrude from the face 21 of stopper element 20, as shown in FIGS. 1A, 1B, and 2. The stopper element may be an overmolded plastic part that surrounds and bonds to the end of the cable and parts of the protruding conductors and the protruding bundle(s) of cable reinforcing strands. Stopper element 20 can be made of polypropylene or ABS as two non-limiting examples of plastics that are suitable for overmolding. Stopper element 20 could alternatively be a separate member that was fixed to the cable, such as a metal or plastic band formed separately from the cable and slid on or crimped on.

As best shown in FIG. 2, the distal end of bundle 30 that protrudes from end face 21 of stopper element 20 is divided into multiple (two, in this non-limiting example) protruding bundle portions 32 and 34. Each of portions 32 and 34 is wrapped at least partly around the perimeter of stopper element 20. In one non-limiting example, portions 32 and 34 are wrapped in opposite directions as indicated by arrows D and E. The wrapping is preferably but not necessarily generally in one or more planes that are generally orthogonal to the plane of the end face 21 of the stopper element. For example, as shown in FIG. 1A face 21 of stopper element 20 lies generally in plane A. Portion 32 is wrapped generally in plane B, below jacket 13 on the cable jacket side 27 of stopper element 20; cable jacket side 27 is opposite face 21. Plane B is transverse (generally perpendicular) to plane A. Portion 34 is wrapped generally in plane C, above jacket 13 on the cable jacket side 27 of stopper element 20. Plane C is transverse (generally perpendicular) to plane A. Since face 21 does not need to be planar, it does not necessarily actually lie in a plane, but it at least in part lies in generally vertical plane A. Also, portions 32 and 34 are partial bundles that each comprise a number of flexible strands. Accordingly, portions 32 and 34 are not actually linear, and so will not lie fully in plane B or C, but the portions do lie generally in such planes. Further, since portions 32 and 34 both emanate from a single bundle 30 where bundle 30 protrudes from face 21 (see FIGS. 1A and 2), and since each of portions 32 and 34 is wrapped either over or under cable jacket 13, portions 32 and 34 necessarily most likely cannot be located in a horizontal plane ("horizontal" taken as perpendicular to plane A, FIG. 1). Accordingly, planes B and C are angled from the horizontal and thus are not actually orthogonal to plane A, but are "generally" transverse or "generally" orthogonal to plane A. Plane C is above cable jacket 13 at side 27 of element 20, and plane B is below cable jacket 13 at side 27 of element 20. Also, planes B and C are generally spaced apart, but may also be intersecting as shown.

If the cable includes more than one bundle of reinforcing strands, one or more of the bundles can be divided and wrapped as described. Or, all of the bundles can be grouped into one super-bundle that is then divided into two (or more) bundle portions and wrapped at least partially around the stopper element, as described above.

Preferably but not necessarily portions 32 and 34 are wrapped in opposite directions (i.e., when viewed from above as in FIG. 1B and FIG. 2, one is wrapped in a clockwise direction and the other in a counter clockwise direction). However, they could both be wrapped in the same direction. And, the wrapping could be in directions other than generally horizontal; for example the wrapping of one or more sub-strands could be generally vertical. Also, preferably but not necessarily, as described above, on cable jacket side 27 one portion is wrapped above the cable (e.g., portion 34 is wrapped over top 12*a* of jacket 13) and the other is wrapped below the cable (e.g., portion 32 is wrapped under bottom 12*b* of jacket 13). However, both portions could be wrapped over or under the cable. Further, preferably but not necessarily, on face side 21 of stopper 20 portions 32 and 34 both lie above conductors 14-17. FIG. 1A shows ends 32*a* and 34*a* of portions 32 and 34 above conductors 14-17; this arrangement inhibits portions 32 and 34 from placing upward force on the conductors which could interfere with their electrical terminations. In an alternative arrangement, one or both of portions 32 and 34 could lie below one or more, or all of, conductors 14-17.

Bundle 30 could be split into more than two portions, each of which was wrapped either partially or fully around stopper element 20. Preferably but not necessarily bundle 30 is divided into two portions as shown, and each portion is wrapped at least once fully around stopper element 20 (i.e., at least 360 degrees around the stopper element) and preferably a bit more than 360 degrees so that there is a little overlap, as shown in FIGS. 1A, 1B and 3. Also, to maximize the surface area for force transfer between each bundle portion and the underlying stopper element, preferably but not necessarily the many strands of the bundle portions are wrapped tightly against the stopper element but the strands are spread out, not twisted and not tightly coiled as the portions are wrapped around the stopper element.

After being wrapped around the stopper element each bundle portion is coupled to the stopper element in an appropriate fashion such that when tension is applied to cable 12 the bundle portions take up the force and inhibit the cable from being pulled out of stopper element 20. The coupling of the bundle portions to the stopper element can be accomplished in any manner that is appropriate given the physical constraints and arrangement of the elements. Preferably but not necessarily this is accomplished using an adhesive substance 42 (e.g., a glue or a pressure-sensitive adhesive), FIG. 3, that adheres the end of the bundle portion (ends 32*a* and 34*a*) to the stopper element. Alternatively such bundle to stopper coupling means could include, for example, a fastener device, an elastic band, a crimped band or a second overmold to hold the bundles in place against the stopper element.

One non-limiting example of an application for the subject electrical cable termination is the cable of an audio headset. Such a headset could have a cable connecting the two earpieces of the audio headset, as well as for making a wired connection to an audio source for receiving audio signals from the source. Alternatively, such a headset could have a cable connecting the two earpieces of the audio headset for transmitting audio signals between the two earpieces, but have a wireless connection to an audio source for receiving audio signals from the source. In either case, audio headsets can include an in-line control module along the cable, typically including volume controls and a button to control telephone calls. The control module includes circuitry mounted on a printed circuit board that is inside a small housing. The cable has a number of conductors that are physically and electrically terminated on the printed circuit board in the housing. The arrangement needs to be such as to prevent tugs on the cable from having an effect on the electrical terminations, which are typically solder joints. Since solder joints have little tensile strength, the cable needs to be terminated such that the force is carried by parts of the cable other than the ends of the conductors. This goal can be accomplished by overmolding a stopper element on the end of the cable jacket and part of the protruding conductors and the reinforcing bundle, and then dividing the reinforcing bundle into two parts and wrapping the parts around the stopper element such that the reinforcement strands take up tugging forces and thus prevent the cable from being pulled from the housing.

Figure 4:
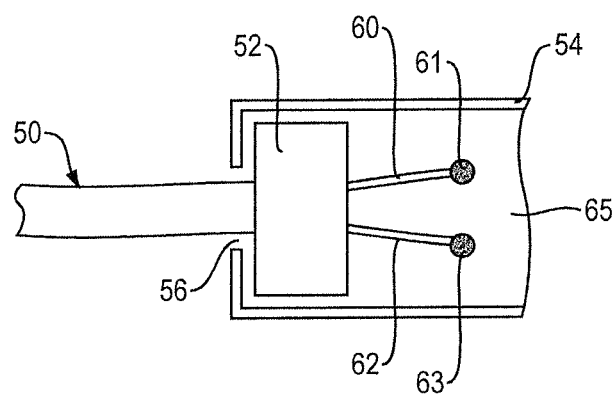
FIG. 4 is a partial, schematic top view of an electrical cable terminated in a housing, illustrating an example of the subject assembly.

An example is schematically depicted in FIG. 4, where cable 50 carries stopper element 52. Exemplary conductors 60 and 62 are terminated at solder joints 61 and 63 on printed circuit board 65 that is inside of housing 54. The divided, wrapped bundle of cable reinforcing strands is not shown, simply for the sake of clarity. Housing 54 includes opening 56 in one end that is slightly larger than cable 50 but smaller than stopper element 52. If cable 50 is pulled, the force will be transmitted from the cable jacket and the reinforcing strands that encircle stopper element 52 to stopper element 52 and to housing 54, rather than to conductors 60 and 62.

FIG. 4 is but one of many possible arrangements in which the subject assembly can be used to fasten an electrical cable to a stopper element at its end such that the cable cannot easily be pulled out of the stopper element. This allows the stopper element to be used as a means to prevent tugging forces from having an effect on the electrical terminations of the cable conductors.

A number of implementations have been described. Nevertheless, it will be understood that additional modifications may be made without departing from the scope of the inventive concepts described herein, and, accordingly, other embodiments are within the scope of the following claims.

What is claimed is:

1. An assembly for providing stress relief for electrical terminations of an audio headset cable, where the electrical cable comprises a plurality of separate conductors, a bundle of cable reinforcing strands, and an outer jacket at least partially surrounding the conductors and the bundle, wherein the conductors and the bundle protrude from an end of the outer jacket, the assembly comprising:
 a stopper element that surrounds the end of the outer jacket and the portions of the conductors and bundle where they protrude from the outer jacket;
 wherein distal ends of the conductors and the bundle protrude from the stopper element; and
 wherein the distal end of the bundle that protrudes from the stopper element is divided into multiple protruding bundle portions, wherein a first protruding bundle portion is wrapped at least partly around the stopper element in one direction and a second protruding bundle portion is wrapped at least partly around the stopper element in another direction.

2. The assembly of claim 1, wherein the stopper element is unitary.

3. The assembly of claim 2, wherein the stopper element is overmolded onto the end of the outer jacket and the portions of the conductors and bundle where they protrude from the outer jacket.

4. The assembly of claim 1, wherein the wrapped protruding bundle portions are coupled to the stopper element.

5. The assembly of claim 4, wherein the wrapped protruding bundle portions are coupled to the stopper element with an adhesive.

6. The assembly of claim 1, wherein the first protruding bundle portion is wrapped fully around the stopper element in one direction and the second protruding bundle portion is wrapped fully around the stopper element in another direction.

7. The assembly of claim 1, wherein the outer jacket of the electrical cable has a top side and an opposing bottom side, and wherein the first protruding bundle portion is wrapped around the stopper element proximate the top side of the outer jacket and the second protruding bundle portion is wrapped around the stopper element proximate the bottom side of the outer jacket.

8. The assembly of claim 7, wherein the first and second protruding bundle portions are both wrapped around the stopper element above the distal ends of the conductors that protrude from the stopper element.

9. The assembly of claim 1, wherein the stopper element has a generally planar front face from which the distal ends of the conductors and bundle protrude, and wherein the first protruding bundle portion is wrapped around the stopper element generally in a first plane that is generally perpendicular to the front face of the stopper element, and wherein the second protruding bundle portion is wrapped around the stopper element generally in a second plane that is spaced from the first plane and generally perpendicular to the front face of the stopper element.

10. An assembly for providing stress relief for electrical terminations of an audio headset cable, where the electrical cable comprises a plurality of separate conductors, a bundle of cable reinforcing strands, and an outer jacket at least partially surrounding the conductors and the bundle, wherein the conductors and the bundle protrude from an end of the outer jacket, the assembly, comprising:
 a unitary stopper element overmolded onto and surrounding the end of the outer jacket and the portions of the conductors and bundle where they protrude from the outer jacket;
 wherein distal ends of the conductors and the bundle protrude from the stopper element; and
 wherein the distal end of the bundle that protrudes from the stopper element is divided into multiple protruding bundle portions, wherein a first protruding bundle portion is wrapped fully around the stopper element in one direction and fixed to the stopper element, and wherein a second protruding bundle portion is wrapped fully around the stopper element in another direction and fixed to the stopper element.

11. The assembly of claim 10, wherein the outer jacket of the electrical cable has a top side and an opposing bottom side, and wherein the first protruding bundle portion is wrapped around the stopper element proximate the top side of the outer jacket, and wherein the second protruding bundle portion is wrapped around the stopper element proximate the bottom side of the outer jacket.

12. The assembly of claim 11, wherein the first and second protruding bundle portions are both wrapped around the stopper element above the distal ends of the conductors that protrude from the stopper element.

13. The assembly of claim 12, wherein the stopper element has a generally planar front face from which the distal ends of the conductors and bundle protrude, and wherein the first protruding bundle portion is wrapped around the stopper element generally in a first plane that is generally perpendicular to the front face of the stopper element, and wherein the second protruding bundle portion is wrapped around the stopper element generally in a second plane that is spaced from the first plane and generally perpendicular to the front face of the stopper element.

14. A method for terminating an electrical cable of an audio headset, the cable comprising a plurality of separate conductors, a bundle of cable reinforcing strands, and an outer jacket at least partially surrounding the conductors and the bundle, wherein the conductors and the bundle protrude from an end of the outer jacket, the method comprising:
 surrounding the end of the outer jacket and the portions of the conductors and bundle where they protrude from the outer jacket with a stopper element, wherein distal ends of the conductors and the bundle protrude from the stopper element;
 dividing the distal end of the bundle that protrudes from the stopper element into multiple protruding bundle portions;
 wrapping one protruding bundle portion at least partly around the stopper element in one direction;
 wrapping another protruding bundle portion at least partly around the stopper element in another direction; and
 coupling the wrapped bundles to the stopper element.

15. The method of claim 14, wherein the stopper element is unitary.

16. The method of claim 15, wherein the surrounding step comprises overmolding the stopper element onto the end of the outer jacket and the portions of the conductors and bundle where they protrude from the outer jacket.

17. The method of claim 14, wherein the coupling step comprises fixing the wrapped protruding bundle portions to the stopper element with an adhesive.

18. The method of claim 14, wherein the first and second protruding bundle portions are both wrapped fully around the stopper element.

19. The method of claim 14, wherein the outer jacket of the electrical cable has a top side and an opposing bottom side, wherein the first protruding bundle portion is wrapped around the stopper element proximate the top side of the outer jacket and the second protruding bundle portion is wrapped around the stopper element proximate the bottom side of the outer jacket, and wherein the first and second protruding bundle portions are both wrapped around the stopper element above the distal ends of the conductors that protrude from the stopper element.

20. The method of claim 14, wherein the stopper element has a generally planar front face from which the distal ends of the conductors and bundle protrude, and wherein the first protruding bundle portion is wrapped around the stopper element generally in a first plane that is generally perpendicular to the front face of the stopper element, and wherein the second protruding bundle portion is wrapped around the stopper element generally in a second plane that is spaced from the first plane and generally perpendicular to the front face of the stopper element.

\* \* \* \* \*